H. B. W. MICHAEL.
ATTACHMENT FOR COFFEE POTS.
APPLICATION FILED JAN. 24, 1917.
1,247,131.
Patented Nov. 20, 1917.
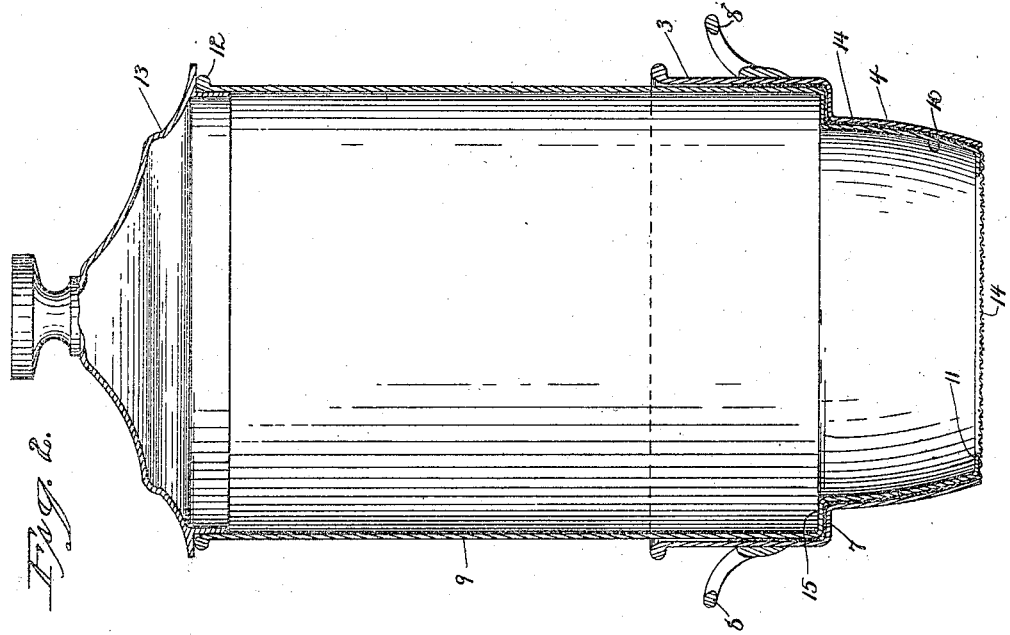
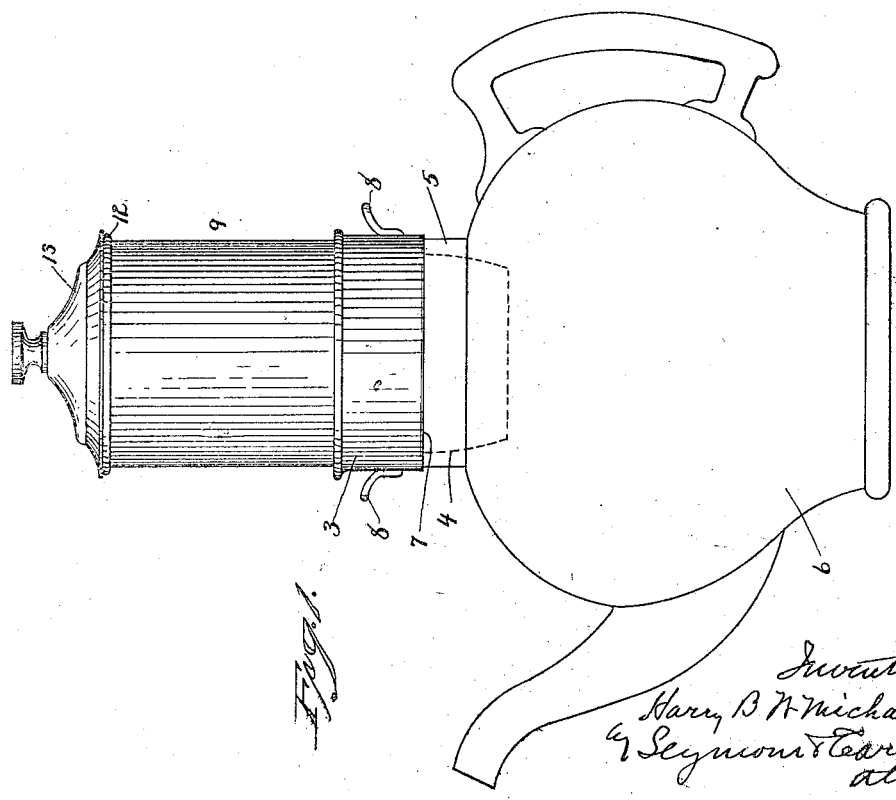

UNITED STATES PATENT OFFICE.

HARRY B. W. MICHAEL, OF MERIDEN, CONNECTICUT, ASSIGNOR TO INTERNATIONAL SILVER CO., OF MERIDEN, CONNECTICUT, A CORPORATION OF NEW JERSEY.

ATTACHMENT FOR COFFEE-POTS.

1,247,131.         Specification of Letters Patent.    Patented Nov. 20, 1917.

Application filed January 24, 1917. Serial No. 144,207.

*To all whom it may concern:*

Be it known that I, HARRY B. W. MICHAEL, a citizen of the United States, residing at Meriden, in the county of New Haven and State of Connecticut, have invented a new and useful Improvement in Attachments for Coffee-Pots; and I do hereby declare the following, when taken in connection with the accompanying drawings and the characters of reference marked thereon, to be a full, clear, and exact description of the same, and which said drawings constitute part of this application, and represent, in—

Figure 1 a side view of an attachment for coffee pots constructed in accordance with my invention, and shown in connection with an ordinary coffee pot.

Fig. 2 a vertical sectional view of my improved attachment.

This invention relates to an improvement in attachment for coffee pots for preparing what is known as drip coffee, the device being adapted to be inserted into the top of an ordinary coffee pot, the object of the invention being to provide a simple arrangement of parts, whereby ground coffee may be placed in a suitable receptacle, the desired quantity of water poured over it and allowed to drip through a suitable strainer into the pot; and the invention consists in the construction hereinafter described and particularly recited in the claim.

In carrying out my invention, I employ a cup-shaped coupling-piece 3 contracted at its lower end to form a neck 4 which is slightly tapering so as to closely fit into the neck 5 of a suitable coffee pot 6. The contracted portion forms a shoulder 7. This coupling-piece may be provided with suitable handles 8, if desired. Combined with this coupling-piece, I employ a container 9 which may be of any desired size. This container is contracted at its lower end forming a shoulder 15 and a skirt 10 corresponding in shape to the lower portion 4 of the coupling-piece but slightly smaller in external diameter than the internal diameter of the coupling-piece. As herein shown, the lower end of the skirt is formed with an internal flange 11 and with a beaded top 12 on which a suitable cover 13 rests. Between the container and coupling-piece a strip 14 of muslin or other suitable material is placed, this muslin closing the lower end of the container and is held in place between the skirt and the lower portion of the container, and provides a packing between them so that the container closely fits and is allowed to bear upon the shoulder in the coupling-piece. The strainer 14 is placed between the container and the coupling-piece, and the device set into the top of the coffee pot on which the shoulder of the coupling-piece rests. Ground coffee is then placed in the container and the desired quantity of boiling water poured on top of the coffee so that water works through the ground coffee and drips into the pot from which it may be drawn in the usual way.

By forming the strainer from fabric, any desired mesh may be employed. This strainer is readily replaced as occasion may require, and the parts are easily separated; consequently cleansing is facilitated.

The device may be made and sold independently of the pot, and used with almost any style of coffee pot.

I claim:—

The herein described drip-coffee apparatus, comprising a cylindrical coffee-container and a cylindrical container-holder, the former being adapted in diameter to be set within the latter, and formed near its lower end with an annular bearing-shoulder from the inner edge of which a concentric tapering fabric-binding flange depends, and the said container-holder being formed with a concentric supporting-shoulder from the inner edge of which a tapering fabric-binding flange depends, and the said flanges being of the same length and the flange of the coffee-container being adapted to fit snugly within the flange of the container-holder to adapt them to bind in place a fabric-strainer drawn over the lower end of the flange of the coffee-container for confining the ground coffee therein.

In testimony whereof, I have signed this specification in the presence of two subscribing witnesses.

H. B. W. MICHAEL.

Witnesses:
  EVELYN J. YOUNG,
  STANLEY PARDEE.

Copies of this patent may be obtained for five cents each, by addressing the "Commissioner of Patents, Washington, D. C."